INVENTOR
PHILIPP G. KORNREICH

BY J. Donald Weber, Jr.
AGENT

United States Patent Office 3,257,629

Patented June 21, 1966

3,257,629

DELAY LINE UTILIZING STRIP LINE WITH MAGNETIC LOADING AND METHOD OF MAKING SAME

Philipp G. Kornreich, Pennsauken, N.J., assignor to Sperry Rand Corporation, New York, N.Y., a corporation of Delaware Filed Dec. 11, 1961, Ser. No. 158,249
7 Claims. (Cl. 333—31)

This invention relates to a delay line. In particular, the delay line is produced by providing a high permeability material between the strip conductors of a transmission line.

It is well known that the speed ($v$) of the electromagnetic wave propagation in a transmission line is inversely proportional to the square root of the permeability ($\mu$) and the dielectric constant (or permittivity $\epsilon$) of the material between the conductors of the transmission line. Thus, $$v=\frac{1}{\sqrt{\mu\epsilon}}$$

It would be clear, therefore, that increasing the permeability or the permittivity of the dielectric material in the transmission line would be effective to vary the speed of propagation of the waves therealong. By changing the speed of the propagation of the electromagnetic wave such that the speed is decreased, a delay line is effected. The specific delay ($t$) is a function of the velocity of the electromagnetic wave propagation and the length ($l$) of the transmission line. Thus, $t=l\sqrt{\mu\epsilon}$.

One means for decreasing the speed of the wave propagation is to increase the permeability of the dielectric material between the transmission lines. Moreover, in order to effect a substantial delay it is desirable that the relative permeability of the dielectric material be substantial. An ideal dielectric, therefore, would include as a portion thereof a magnetic material having a uniaxial magnetic anisotropy. Such a magnetic material is characterized by HARD and EASY magnetization directions, as is known in the art. This type of magnetic material, normally in the form of a thin film, may be oriented such that the flux lines created by current flow in the transmission line pass therethrough in the HARD magnetization direction. In this condition, the delay line is relatively lossless inasmuch as the hysteresis characteristic for the thin film is a substantially linear one. That is, there are no hysteresis losses incurred therein. Moreover, by utilizing a thin magnetic film such as that described, the permeability in the HARD direction may be approximately 10,000 times the permeability of air. The velocity of propagation is, therefore, approximately $\frac{1}{100}$ that of light. The particular type of film which may be utilized may be varied in accordance with the method of deposition desired or by other preferred manufacturing methods. A typical thin film which provides the necessary characteristics is Permalloy or virtually any other magnetic film having the 80% Fe, 20% Ni formulation. Reference is made to the Journal of Applied Physics, volume 34, No. 4 (part 2), April 1963, pages 1169 to 1170, wherein an article entitled "Variable Delay Magnetic Strip Line" by P. Kornreich and S. R. Pollack appears.

Clearly, one object of this invention is to provide a simple delay line.

Another object of this invention is to provide a delay line which provides a given delay time in a shorter physical length.

Another object of this invention is to provide a given delay time in a shorter physical length whereby ohmic losses are reduced.

Another object of this invention is to provide a delay line wherein the delay per unit length is substantially increased.

Another object of this invention is to provide a delay line utilizing a thin magnetic film having a large permeability as part of the dielectric between the conductors of a transmission line.

These and other objects of this invention will become more readily apparent subsequent to a reading of the following description in conjunction with the accompanying drawings in which.

Figures 1, 2:
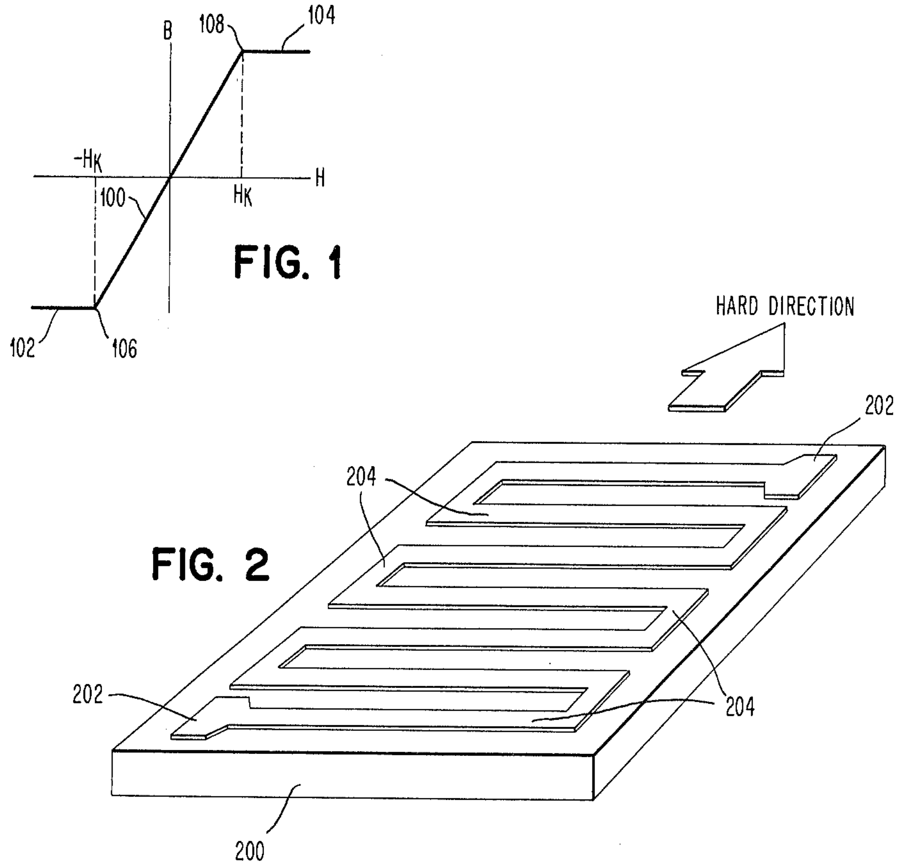
FIGURE 1 is a graphical representation of the linear hysteresis characteristic for the preferred dielectric magnetic film.
FIGURE 2 is an isometric view of one embodiment of the invention showing a preferred configuration.

Referring now to FIGURE 1, there is shown a typical hysteresis characteristic for a thin magnetic film having uni-axial magnetic anisotropy and characterized by HARD and EASY magnetization directions. This hysteresis characteristic is exhibited when the film is oriented such that the flux lines linked thereto are substantially in the HARD direction. It will be seen, that the hysteresis characteristic is a substantially linear one. The characteristic is comprised substantially of three important portions or areas of operation. Portion 100 (the slope portion of the characteristic) represents the unsaturated condition of the thin magnetic film. That is, the magnetization vector of the thin magnetic film (assumed to be a single domain) is free to rotate. Portions 102 and 104 of the characteristic represent the saturated regions of the film. That is, when the film is operating in portion 102 or 104 the magnetization vector of the magnetic film is aligned in the HARD direction and the application of further fields will not effect further rotation of the vector.

Experimental evidence has indicated that while operating in portion 100 the relative permeability of the film is approximately 10,000 times that of air. Thus effectively, the relative permeability of the unsaturated film when flux is linked thereto in the HARD direction is substantially 10,000. The relative permeability of the film when operating in the saturated regions represented by portions 102 and 104 is substantially the same as permeability of air. That is, the effective relative permeability of the film in the saturated condition is 1. Clearly, in order to effect the desired result, the film must be operated in the region designated by portion 100 or the unsaturated region. That is, the film must operate between the breakpoints of the curve which represent the anisotropy field constant $H_k$ of the film.

Referring now to FIGURE 2 there is shown a preferred embodiment of the invention. That is, in FIGURE 2 there is shown one possible configuration of the invention. It is to be understood that the configuration shown in FIGURE 2 is not meant to be limitative of the invention but is merely illustrative thereof. In FIGURE 2 the delay line is shown mounted on a base 200. The base 200 may represent, for example, a glass substrate, or the like, upon which the line is mounted. In the alternative, the base 200 may represent the ground plane for the transmission line. In any event, the base 200 is utilized primarily to support the transmission-line delay-line which is the subject of this invention. At either end of the delay line, there are shown pads 202. These pads may represent input or output land pads much the same as are utilized in printed circuit configurations. Between the input and/or output pads 202, there is connected the transmission line which forms the delay line. A detailed view of the construction of the transmission line is shown in FIGURE 3.

As shown in FIGURE 2, the transmission line 204 follows a zig-zag path between the input and/or output pads 202. Of course, the conductor 204 need not follow the zig-zag path but in the event that a long delay is desired this zig-zag path provides a more compact delay line element. It is to be understood that the HARD direction (as indicated) represents the HARD direction of the thin magnetic film which is used as part of the dielectric for the transmission line. That is, the current is applied to the circuit via one of the pads 202 and withdrawn from the circuit by the other of the pads 202. The current follows the path of the conductor 204 and sets up a flux path which encircles the conductor. This flux path links the thin magnetic film which is part of the dielectric between the conductors of the transmission line. When the flux links the thin magnetic film, in the configuration shown, the flux is applied to the film in the HARD direction whereby the thin magnetic film assumes the characteristic shown in FIGURE 1. That is, the permeability of the thin magnetic film approaches 10,000 and the velocity of the propagation of the electromagnetic wave down the conductor 204 is delayed. As discussed supra, it must be clear that the field produced by the current applied to the conductors 204 must fall within the limits prescribed by $-H_k$ and $+H_k$ so that the film remains in the unsaturated condition and the permeability remains high.

It is, of course, preferred that the thin magnetic film between the conductors 204 should be situated such that the flux which is produced by the current flowing through conductor 204 should link the film in the HARD direction. However, it is sometimes difficult to deposit the film with the HARD direction available for the longer portions of the conductor as well as for the short interconnecting pieces at the ends of two adjacent longer runs. It is clear that, in this case, the film is to be laid down such that the HARD direction prevails along the longer portions of the conductor. That is, the short connecting end pieces may actually be such that the film exhibits the EASY direction of magnetization to the flux which links the short film pieces. However, design considerations are rendered relatively simple by utilizing a short length of interconnection. Thus, although there is no delay produced by the end connections, the delay in the longer portions of the conductors are substantial and override the end effects.

Figure 3:
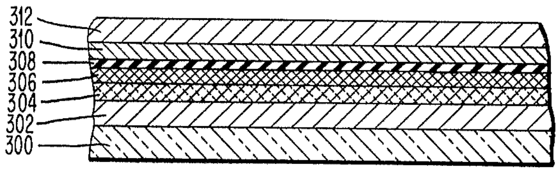
FIGURE 3 is a cross sectional view of a portion of the delay line configuration shown in FIGURE 2.

Referring now to FIGURE 3, there is shown a cross-sectional view of the transmission line delay line. Substrate 300 is similar to substrate 200 (see FIGURE 2) and, as described supra, may comprise any suitable substrate material as for example glass. In the alternative, base 300 may represent the ground plane conductor. Effectively, base 300 is utilized primarily for support purposes. In the event that the base 300 is a substrate material, a first conductor 302 is mounted thereon. Conductor 302 may be any desired conductor, as for example a strip of copper or silver. The conducting strip, which may be mounted on the base 300 by any suitable means as for example electroplating, etching or other deposition methods, typically is 40,000 A., or more, in thickness. Layer 304 represents a chromium or aluminum layer in the order of 100–300 A. thick. This chromium layer is not absolutely necessary to all embodiments of the invention. However, if the entire transmission line is laid down on the base in separate step processes, the chromium or aluminum may be desirable in order to provide a better bonding surface for the remainder of the transmission line. Similarly, layer 306 represents a layer of gold on the order of 100–300 A. thick. Again, this layer which may be eliminated in some production processes provides a better bonding surface. Furthermore the gold layer may materially aid in the construction of the transmission line due to improved magnetic properties of the film when deposited on the gold. Layer 308 is an insulation layer the thickness of which may vary between 500–10,000 A. This insulation layer may be any of the known types of layers as for example SiO, or $Al_2O_3$. This insulating layer is utilized to eliminate the electrical contact between the two conductors of the transmission line. Also, since the impedance (Z) of the transmission line is a function of the dimensions of the line $$\left(Z=\frac{a}{b}\sqrt{\mu/\epsilon}\right.$$

where $a$=the space between the conductors and $b$=the width of the conductors and $\mu$ and $\epsilon$ have been previously defined), the large variation in insulation thickness may be utilized to vary the impedance of the line. Layer 310 represents the thin magnetic film which is utilized in the fabrication of the transmission-line delay-line. As described supra, this thin film should be of the uni-axial anisotropy type of film which exhibits HARD and EASY magnetization directions. Typical films are Permalloy or virtually any 80% Fe, 20% Ni class of film. Finally, layer 312 is representative of the second conductor in the transmission line and again may be a 40,000 A. thick (or more) strip of suitable conducting material, as for example, copper or silver.

It should be noted, that the transmission line is substantially wider than the distance between the conductors of the line. By providing such a transmission line configuration, the majority of the flux lines are parallel to the HARD direction of magnetization factor and, therefore, link the film 310 in the HARD direction. Moreover, end effects or edge effects are minimized. The width of the transmisison line may vary between 0.05–2.0 millimeters. Typical dimensions for the width ($b$) and thickness ($a$) of the overall transmission line (exclusive of the substrate base) are; therefore, $a$=5,000 A.
$b$=0.2 millimeter thereby providing a constant ($a/b$) of about $2.5\times10^{-3}$ for impedance calculations.

It is, of course, to be understood that the preferred fabrication of the transmission line is not limitative of the invention. Rather, this construction is illustrative only. For example, as suggested supra, the gold or chromium layers may be eliminated. Moreover, the base 300 may be eliminated and the conductor 302 substituted therefor. Moreover, the precise order of applying the layers 302 through 312 is not absolutely rigid so long as the insulating layer is located between the two conducting layers.

It is clear that the principles and scope of the invention are not limited to those discussed herein. That is, variations on the configurations suggested may become apparent to those skilled in the art. However, the invention is meant to include such variations on the configuration which fall within the principle of the inventive concepts set forth.

Having thus described the invention what is claimed is:

1. In combination, a first conductor, a second conductor related to said first conductor to provide a transmission line effect, a dielectric therebetween, said dielectric including an insulating material to prevent short circuits between said conductors, said dielectric further including a thin magnetic film, said film being of the type composed of about 80% Fe and 20% Ni and characterized by uniaxial anisotropy, said film exhibiting a large permeability when subjected to a magnetic field in the HARD magnetization direction thereof, input means adapted to supply current to said conductors such that a magnetic field links said film in the HARD direction, and output means adapted to provide outputs subsequent to the application of inputs at said input means.

2. In combination, a first electrical conductor deposited on a supporting base, a second electrical conductor deposited with respect to said first conductor to provide a transmission line effect, a spacer between said conductors, said spacer including an insulating material to prevent short circuits between said conductors, said spacer further including a thin magnetic film, said film being of the type composed of about 80% Fe and 20% Ni and characterized by uniaxial anisotropy, said film exhibiting a large permeability when subjected to a magnetic field in the HARD magnetization direction thereof, bonding materials deposited adjacent at least one of said conductors to facilitate the deposition of said thin magnetic film, input means adapted to supply current to said conductors such that a magnetic field links said film in the HARD magnetization direction thereof, and output means adapted to provide outputs subsequent to the application of inputs at said input means.

3. The method for making a relatively lossless delay-line comprising the steps of:

preparing a first electrically conducting layer of copper, depositing a bonding layer of gold or chromium on said first conductive layer, depositing a thin layer of a typical nickel-iron magnetic material on said bonding layer, depositing an insulating layer of SiO on said magnetic layer, and depositing a second conducting layer of copper on said insulating layer such that said conducting layers represent a transmission line and the other layers represent the dielectric between said transmission line conductors.

4. A delay line element comprising a transmission line having a plurality of parallel sections with the alternate ends thereof connected together, said transmission line including first and second electrical conductors, a planar insulating layer disposed intermediate said conductors, and a planar magnetizable layer disposed intermediate said conductors, said insulating layer providing a nonconducting connection between said first and second conductors, said magnetizable layer exhibiting uniaxial anisotropy and being characterized by HARD and EASY magnetization directions, said magnetizable layer exhibiting high permeability when a magnetic field is applied thereto in response to current flow in said conductors.

5. A delay line element comprising first and second electrical conductors, and planar spacer means disposed intermediate said conductors to form a transmission line, said spacer means including an insulating portion and a magnetizable portion, said magnetizable portion exhibiting uniaxial anisotropy and being characterized by HARD and EASY magnetization directions, said magnetizable portion exhibiting large permeability when a magnetic field is applied thereto in the HARD magnetization direction in response to current flow in said conductors, said transmission line having a plurality of convolutions so arranged that a plurality of parallel transmission line sections are provided.

6. A delay line exhibiting a delay T, which is a function of the length L, and the propagation velocity V, and which comprises a pair of electrically conductive members of length L, a thin magnetic film located between said conductive members, said film characterized by a uniaxial anisotropy and substantially no remanence when a magnetic field is applied thereto in the HARD magnetization direction thereof, said film exhibiting a relative $\mu$ which may be selectively switched in the range of about 1 to 10,000 by the application thereto of a magnetic field, a layer of electrically insulating material interposed between said magnetic layer and one of said conductive elements, said insulating material exhibiting a relatively fixed value of $\epsilon$, said thin magnetic film and said layer of electrically insulating material comprising a spacer between said electrically conductive members whereby a transmission line is produced, said transmission line exhibiting a propagation velocity of $$V=\frac{1}{\sqrt{\mu\epsilon}}$$

and means for receiving an electric current for application to said conductors such that a magnetic field is produced therearound and links said film in the HARD magnetization direction thereof such that said spacer is switched and exhibits a high $\mu$ between said conductors whereby the speed of electromagnetic propagation therealong is reduced and the delay is induced as a function of the increase of $\mu$.

7. The method recited in claim 3 wherein the preparation of said first electrically conducting layer includes the deposition thereof on an insulating substrate base.

References Cited by the Examiner

UNITED STATES PATENTS

| | | | |
|---|---|---|---|
| 2,027,067 | 1/1936 | Schubert | 333—79 |
| 2,756,394 | 7/1956 | Sieven et al. | 333—79 |
| 2,816,273 | 12/1957 | Peck | 333—23 |
| 3,051,891 | 8/1962 | Jorgensen | 333—79 |
| 3,072,869 | 1/1963 | Seidel | 333—81 |
| 3,141,145 | 7/1964 | Barrett | 333—79 |
| 3,163,833 | 12/1964 | Burson | 333—79 |

HERMAN KARL SAALBACH, *Primary Examiner.*

C. BARAFF, *Examiner.*